US007263765B1

(12) United States Patent
Smith et al.

(10) Patent No.: US 7,263,765 B1
(45) Date of Patent: Sep. 4, 2007

(54) MARINE BEARING ALIGNMENT AND INSERTION TOOL

(76) Inventors: Thomas F. Smith, 15365 St. Rt. 170, East Liverpool, OH (US) 43920; Craig Nentwick, 44017 Jaunt Rd., Wellsville, OH (US) 43968

( * ) Notice: Subject to any disclaimer, the term of this patent is extended or adjusted under 35 U.S.C. 154(b) by 493 days.

(21) Appl. No.: 10/847,726

(22) Filed: May 17, 2004

(51) Int. Cl.
*B23P 19/04* (2006.01)
*B21D 53/10* (2006.01)

(52) U.S. Cl. ............................ 29/724; 29/270; 29/271; 29/261.1; 29/262

(58) Field of Classification Search .................. 29/724, 29/244, 270, 271, 278, 280, 281.1, 282, 898.07, 29/898.08, 898.09, 256, 263
See application file for complete search history.

(56) References Cited

U.S. PATENT DOCUMENTS 2,586,222 A * 2/1952 Hamilton ..................... 29/283
3,383,755 A * 5/1968 Chemielewski ............. 29/264
3,722,057 A 3/1973 Barnes
4,212,098 A * 7/1980 Sand ........................... 29/460
4,255,839 A 3/1981 Shea
4,507,838 A * 4/1985 Hacker ........................ 29/263
4,709,459 A * 12/1987 Klann ......................... 29/263
5,355,574 A * 10/1994 Zweekly et al. ............. 29/262
5,509,186 A * 4/1996 Straut .......................... 29/256
5,623,761 A * 4/1997 Chiang ........................ 29/724
5,836,067 A 11/1998 Cochran
5,890,271 A * 4/1999 Bromley et al. .............. 29/263
6,006,411 A 12/1999 Kilgore et al.
6,085,402 A * 7/2000 Hill, Jr. .................. 29/402.03
6,092,279 A * 7/2000 Shoup .......................... 29/724
6,209,183 B1 * 4/2001 Bugosh ....................... 29/280
6,401,338 B1 * 6/2002 Hill et al. ................ 29/898.08
6,446,328 B1 * 9/2002 Heflin ......................... 29/724
7,191,504 B1 * 3/2007 Charron ....................... 29/278
2002/0010996 A1 1/2002 Sarver
2004/0143947 A1 * 7/2004 Dagot ......................... 29/280
2005/0251996 A1 * 11/2005 Vencill ........................ 29/705
2006/0272140 A1 * 12/2006 Kang .......................... 29/278

* cited by examiner

*Primary Examiner*—Essama Omgba
(74) *Attorney, Agent, or Firm*—Harpman & Harpman

(57) ABSTRACT

A bearing alignment and insertion tool wherein a gimble bearing must be rotatably aligned with a grease fitting during insertion. The tool utilizes an alignment shaft with a cylindrical mounting sleeve slidably positioned thereon. A mounting plate secures the tool to the engine's bell housing allowing incremental advancement of the shaft there against. The shaft is keyed to the cylindrical sleeve advancing same against the bearing for proper insertion and seating.

7 Claims, 7 Drawing Sheets

MARINE BEARING ALIGNMENT AND INSERTION TOOL

BACKGROUND OF THE INVENTION

1. Technical Field

This invention relates to marine engine applications that require bearing replacement. Due to the relative positioning of the bearing it is oftentimes a difficult procedure to both align the bearing and press fit it into place.

2. Description of Prior Art

Prior art devices of this type have been directed to bearing insertion and pulling tools that are used to insert and remove bearings. Such insertion and removal tools can be seen in U.S. Pat. Nos. 3,722,057, 4,255,839, 5,836,067, 6,006,411 and published Patent 2002/0010996 A1.

In U.S. Pat. No. 3,722,057 a bearing securing tool can be seen in which an elongated rod has a pivoted bearing engagement member.

U.S. Pat. No. 4,255,839 discloses an automotive clutch alignment tool having a dummy drive shaft for aligning parts including splined cylindrical and smooth tubular members for engagement with the clutch disk and relative bearing parts.

U.S. Pat. No. 5,836,067 claims a tool for removing hub assemblies from outboard stern drive engines. The tool threadably engages the end of a bearing carrying shaft and applies removal pressure thereto by rotation of a threaded nut thereon.

U.S. Pat. No. 6,006,411 discloses a bearing carrier puller with improvements for a marine drive train. Improvements are applied to a "Barrow's" tool by eliminating the abutment handle so an air socket wrench can be used in place thereof. Other improvements consist of preliminary nut rotation beyond a safe point as will be evident to those familiar with the "Barrow's" tool.

Patent publication US 2002/0010996 A1 is directed to a method and apparatus for installing and removing bearing races. A cross block with oppositely disposed alignment bolts has a central bearing engagement bolt which is threadably advanced pulling against the bearing race.

Other prior art bearing insertion tools can be seen in publications Exhibit A and Exhibit B under mercstuff.com on a MerCruiser alignment tools and gimbal bearing drivers to align and seat a bearing. The alignment tool is an elongated shaft with multiple areas of reduced diameter to accommodate different bearing application situations. The gimbal bearing driver shown in Exhibit B is an elongated shaft with varying diameter areas and a drive head secured to it.

Essentially the concept behind both of these tools is that you engage the bearing with the drive head and pound the opposite end of the shaft until the bearing is seated.

SUMMARY OF THE INVENTION

A marine bearing alignment and insertion tool that rotatably orients the bearing for proper grease fitting compliance and progressive advancement of the bearing into position under gradual linear pressure. The tool provides for a bearing orientation to be maintained during the insertion process.

A sliding sleeve engages and holds and advances the gimbal bearing during insertion. The sleeve is advanced by engagement with an alignment shaft on which the bearing is positioned.

DESCRIPTION OF THE PREFERRED EMBODIMENT

Figure 3:
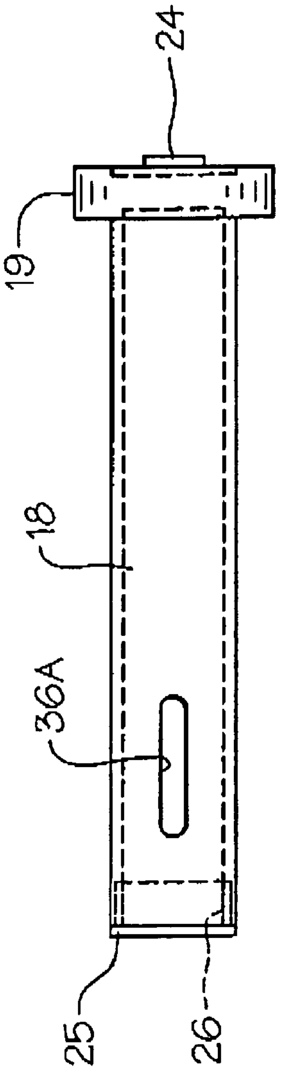
FIG. 3 is a side elevational view of the sleeve of the invention.
Figure 4:
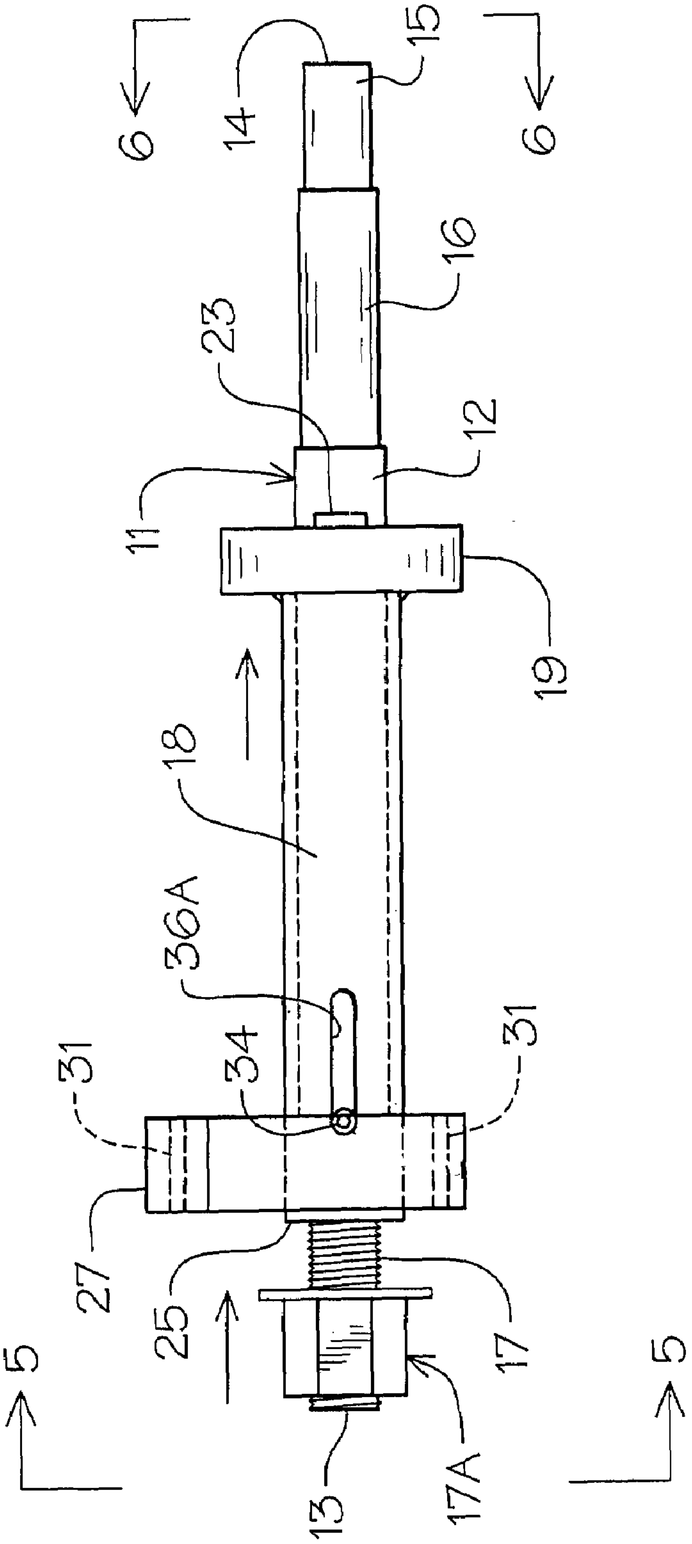
FIG. 4 is a side elevational view thereof.
Figure 6:
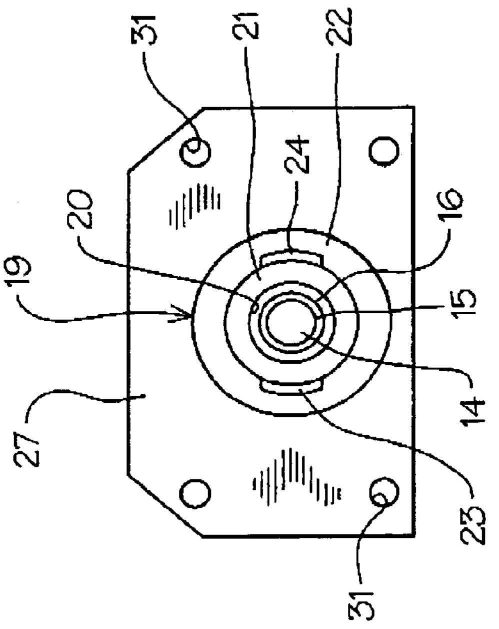
FIG. 6 is an end elevational view on lines 6-6 of FIG. 4.

Referring now to FIGS. 1-4 of the drawings, a bearing alignment insertion tool 10 of the invention can be seen. The tool 10 has a main shaft 11 with a main body member portion 12 with oppositely disposed ends 13 and 14. Areas of reduced diameter at 15 and 16 extend inwardly from the shaft end 14 to accommodate different bearing requirements as will be discussed in detail hereinafter. A threaded area of reduced diameter at 17 extends inwardly from said oppositely disposed end 13 for engagement of an advancement nut washer assembly 17A thereon. A drive orientation sleeve 18, best seen in FIGS. 3 and 4 of the drawings has an annular bearing engagement fitting 19 secured at one end thereof. The bearing engagement fitting 19 has a central opening at 20 there through with a recessed area 21 defining an annular perimeter shoulder 22. A pair of oppositely disposed upstanding arcuate bearing engagement keys 23 and 24 extend from the shoulder 22 adjacent the perimeter edge of the recess area 21 as best seen in FIGS. 3, 4 and 6 of the drawings. The bearing engagement fitting 19 is secured to the main sleeve body 11 by welding becoming an integral part thereof. An annular bushing 25 is pressed fit into the opposite end of the sleeve 18 at 26 to provide a wear engagement surface for the drive nut and washer assembly 17A as will be described in detail hereinafter.

Figure 1:
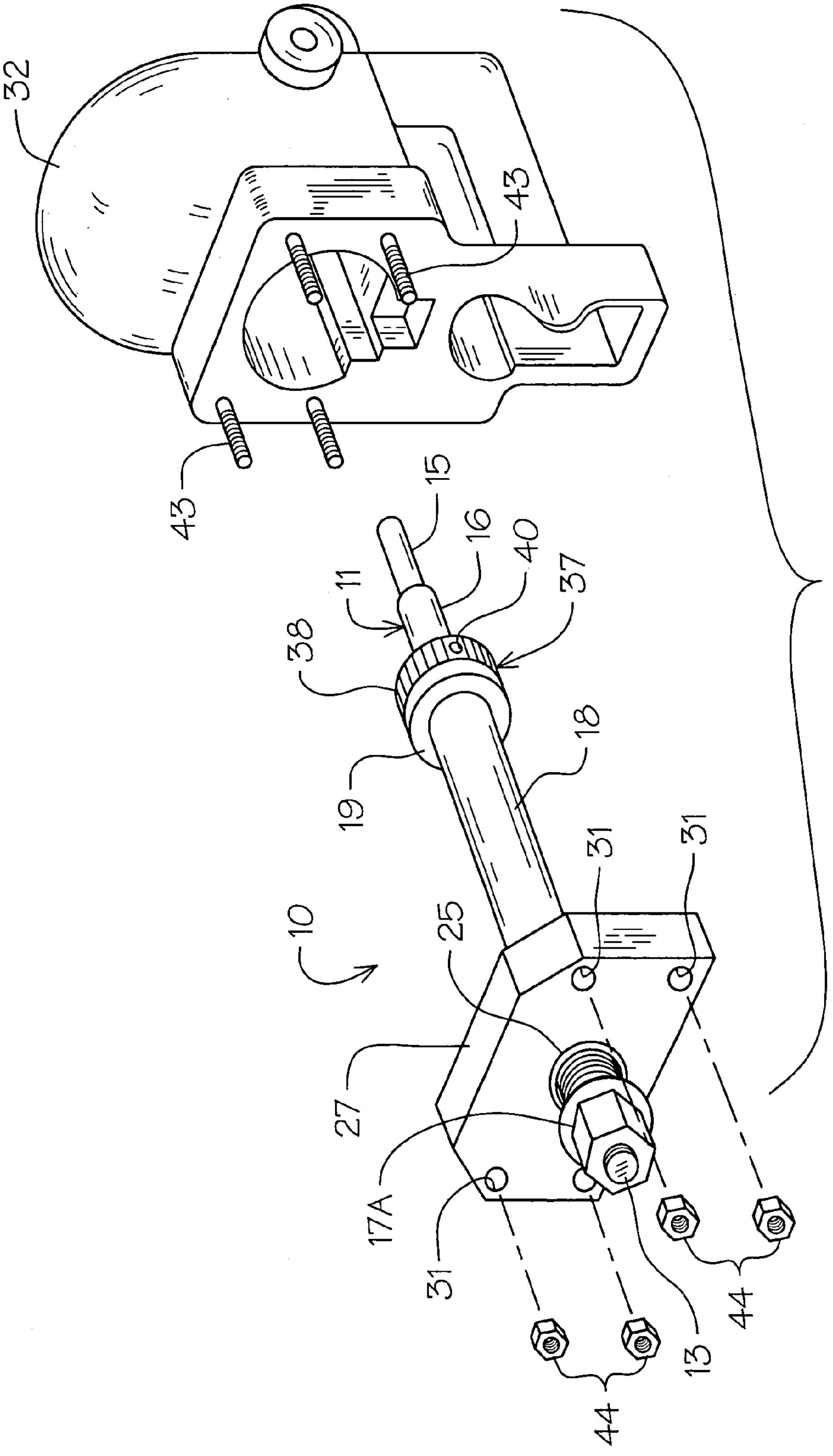
FIG. 1 is an exploded perspective view of the bearing alignment insertion tool of the invention.
Figure 2:
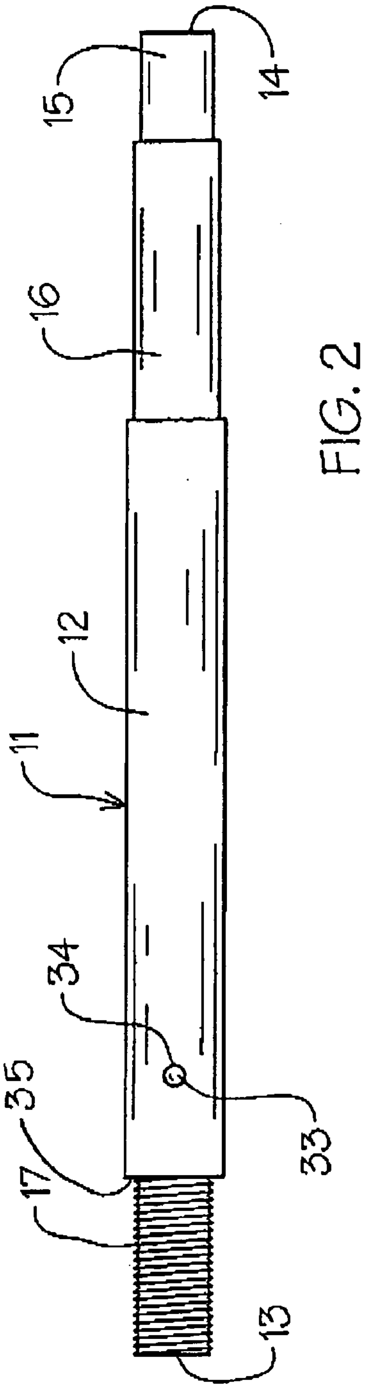
FIG. 2 is a side elevational view of a drive shaft of the invention.
Figure 5:
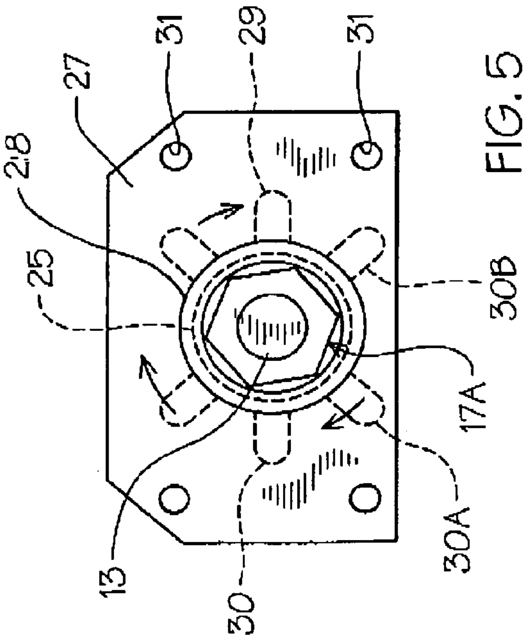
FIG. 5 is an end elevational view on lines 5-5 of FIG. 4.
Figure 7:
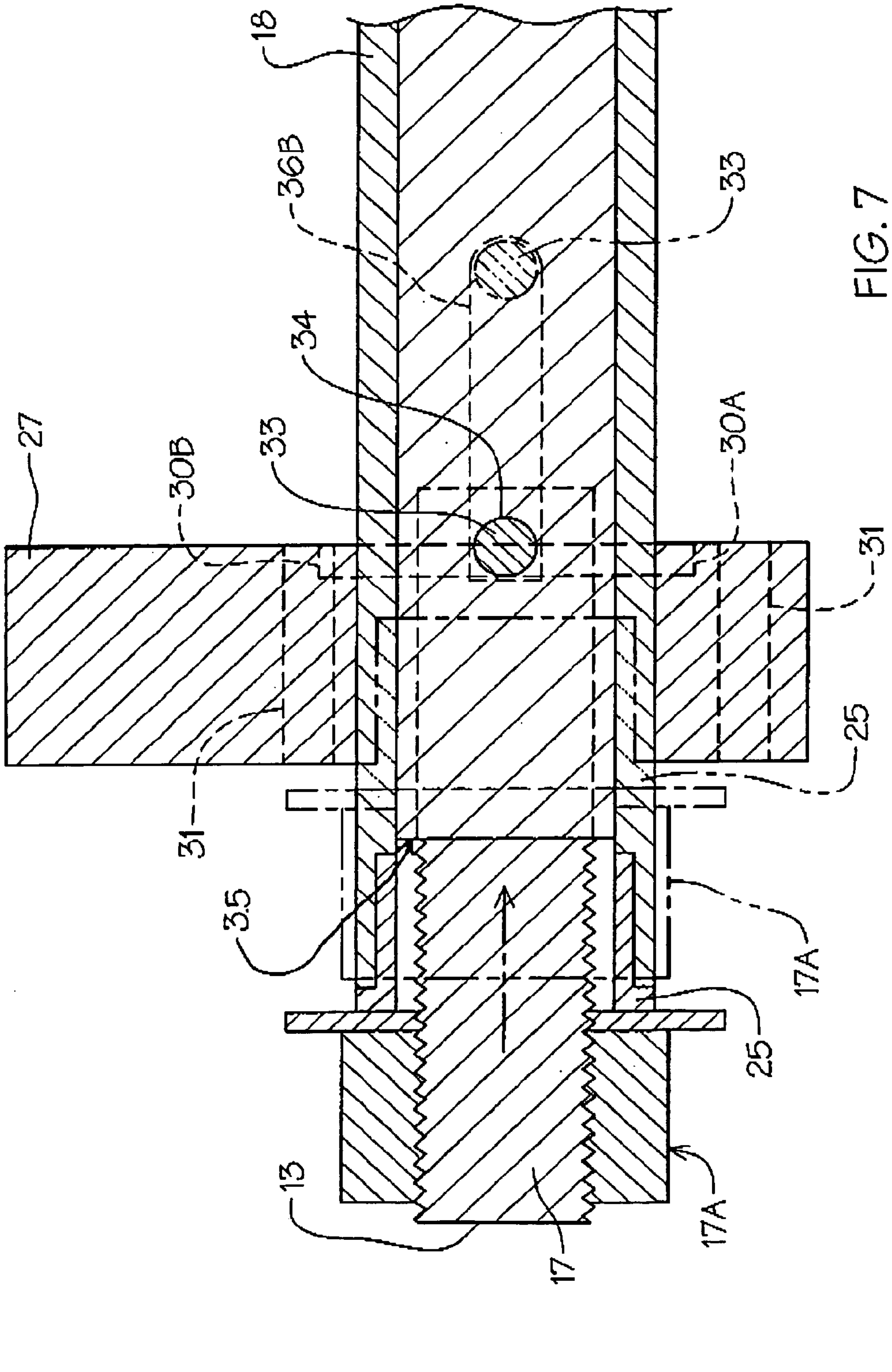
FIG. 7 is an enlarged partial cross-sectional view thereof.

Referring now to FIGS. 1, 4, 5, 6 and 7 of the drawings, a mounting plate 27 of the bearing insertion tool 10 can be seen having a generally rectangular configuration with a main central aperture at 28 there through and multiple longitudinally aligned channel notches 29, 30, 30A and 30B intersecting same as best seen in FIGS. 4 and 5 of the drawings. A plurality of mounting apertures 31 extend through the mounting plate 27 for securing the plate 27 to a bell housing 32 during use as seen in FIG. 1 of the drawings. The tool 10 of the invention as assembled, best seen in FIGS. 1 and 6 of the drawings, has the main shaft 11 inserted within the drive and alignment sleeve 18 with an engagement pin 33 extending through a transverse aperture at 34 inwardly of the end 13 of the main shaft 11 in spaced relation to a transition point at 35 between the threaded area of reduced diameter at 17 and the main body member portion 12, best seen in FIGS. 4 and 7 of the drawings. A pair of oppositely disposed elongated parallel slots at 36A and 36B are formed within the sleeve 18 registerable with the hereinbefore described engagement pin 33 extending from the main shaft 11 which allows for linear force transfer from the main shaft 11 to the sleeve 18 and associated bearing engagement fitting 19 as will be noted.

Figure 8:
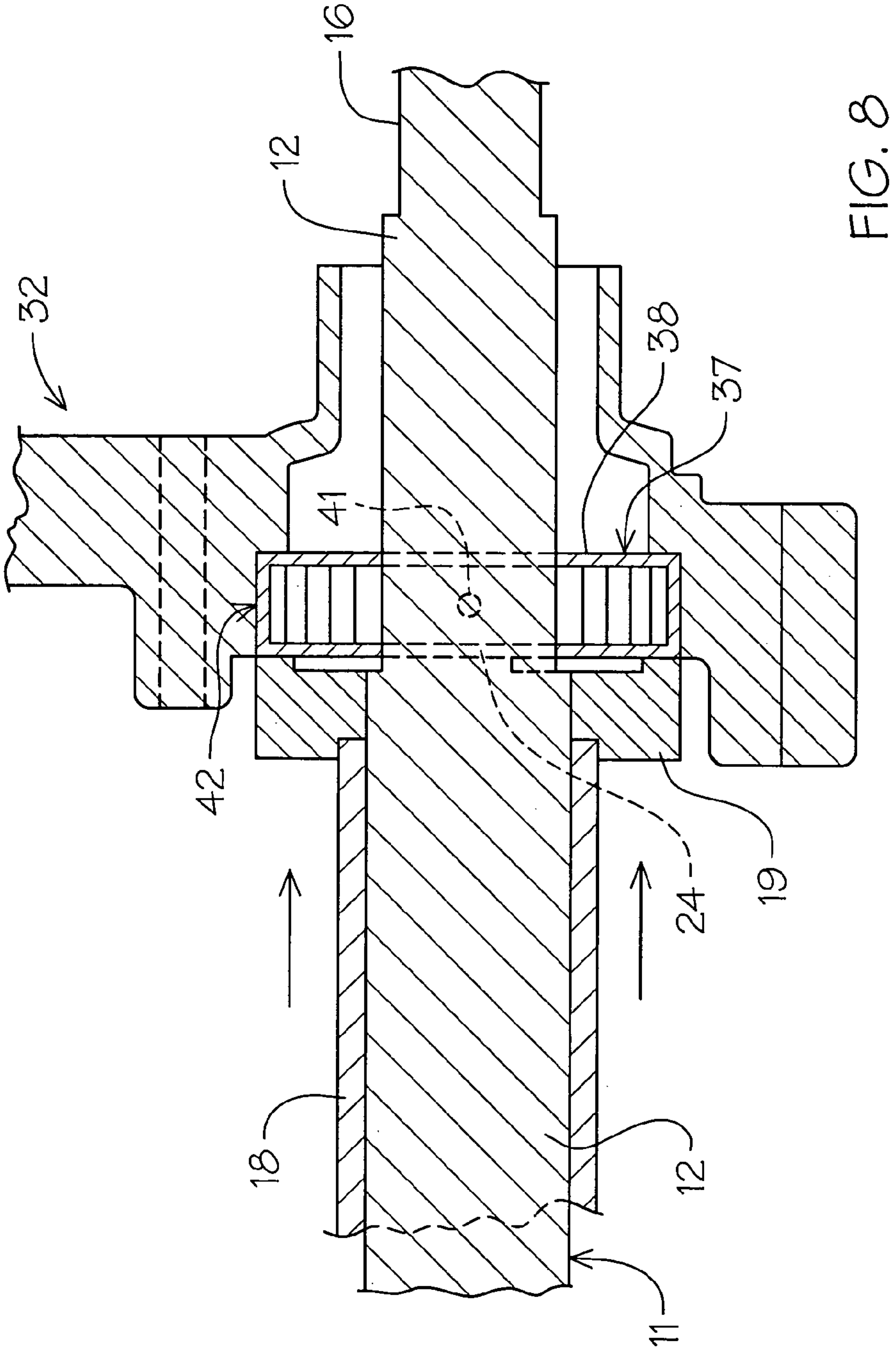
FIG. 8 is an enlarged partial cross-sectional view of the bearing engagement positioned on the insertion tool.
Figure 9:
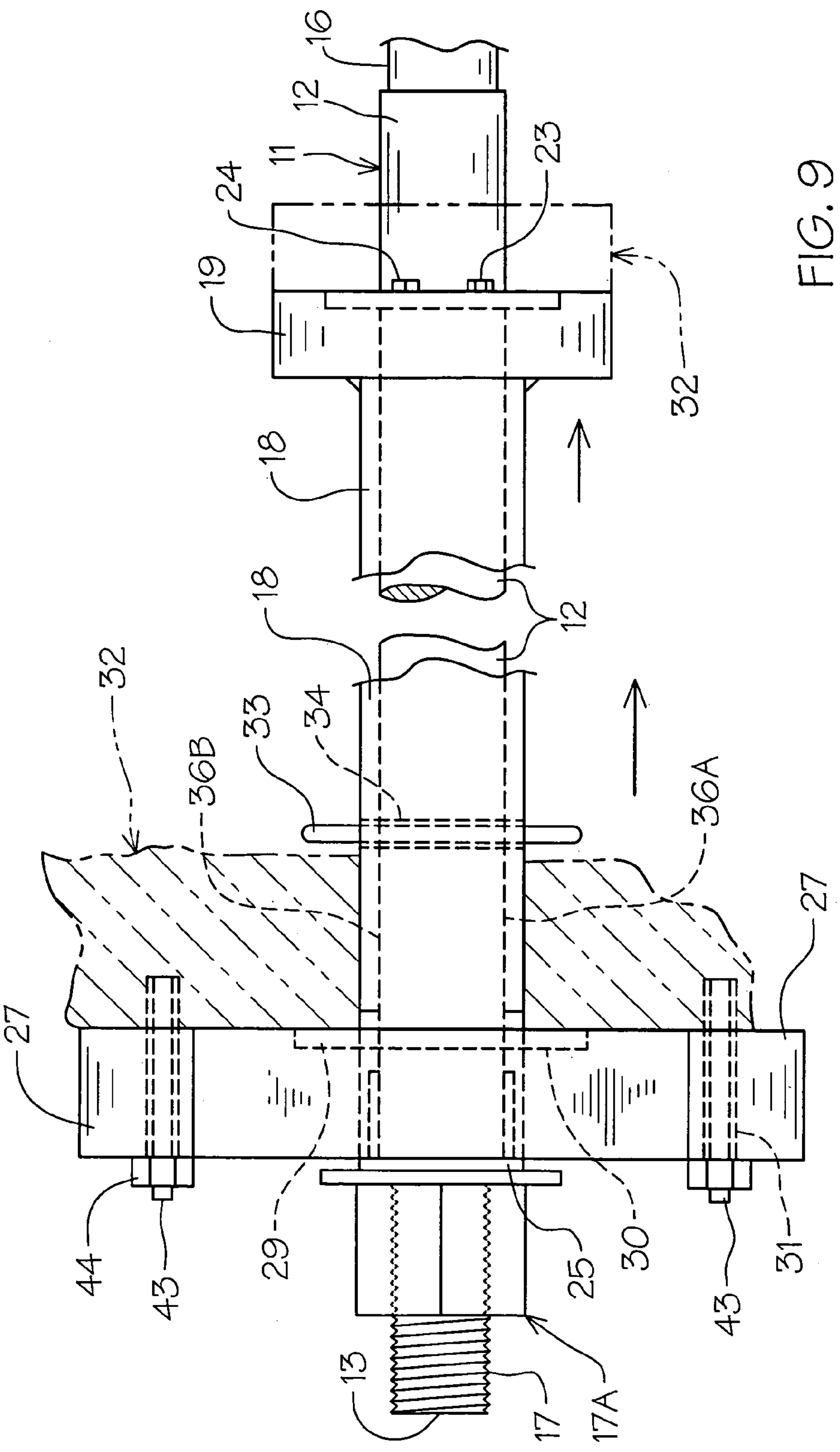
FIG. 9 is a top plan view of the insertion tool with portions broken away.

Referring now to FIGS. 1 and 8 of the drawings, a gimbal bearing assembly 37 can be seen for mounting within the marine bell housing 32. The bearing assembly 37 includes a bearing holder 38 with a greased fitting 40 for supplying lubrication to the bearings within from a correspondingly aligned transfer portal shown at 41 for illustration and description purposes only.

As seen in FIG. 8 of the drawings, a gimbal bearing seat 42 is illustrated with the bearing assembly 37 rotatably keyed onto the bearing engagement fitting 19 via the alignment lugs 23 and 24 and rotatably oriented for alignment of the greased fittings as hereinbefore described.

In use, the bearing insertion tool 10 of the invention with the bearing assembly 37 aligned thereon is inserted into the bell housing 32 which has multiple threaded mounting studs 43 extending there from. The mounting plate 27 is secured thereto by multiple threaded fasteners (nuts) 44 engageable on the respective studs 43 and tightened with the bearing assembly 37 as previously described against the bearing seat 42 ready for insertion. The pin 33 is, as noted, engaged through the respective slots 36A and 36B against the sleeve 18 illustrated in broken lines in FIG. 7 of the drawings. The nut and washer assembly 17A threadably positioned on the area of reduced threaded shaft 17A is then rotated against the bushing 25 advancing the sleeve 18 with the bearing engagement fitting 19 seating the bearing fitting assembly 37 within the bearing seat 42 as illustrated in FIG. 8 of the drawings.

The bearing insertion tool 10 is then removed from the bell housing 32 leaving the gimbal bearing assembly 37 properly oriented for lubrication and seated within.

It will be evident from the above description that the bearing alignment insertion tool 10 of the invention will allow easy gimbal bearing installation. It will align the grease port 40 on the bearing to the grease port 41 within the gimbal housing. The tool 10 will align the gimbal bearing with the engine coupler and press fit the bearing assembly 37 therein easier and with less possible damage as hereinbefore possible.

The gimbal bearing tool 10 of the invention is easier and quicker to use than commonly used methods. It allows for less time aligning the gimbal bearing assembly 37 and engine coupler. The need for manually aligning bearing grease ports is not necessary when using the tool and the pressing of the bearing is easier and there is little possibility of damage, as noted, to the bearing or the gimbal housing when utilizing the installation tool 10 of the invention.

It will be evident from the above description that by utilization of multiple channel notches 29, 30 and 30A shown in broken lines that a variety of different marine engines can be addressed.

It will thus be seen that a new and novel marine bearing alignment insertion tool has been illustrated and described and it will be apparent to those skilled in the art that various changes and modifications may be made therein without departing from the spirit of the invention.

We claim:

1. A bearing alignment and insertion tool for marine engines comprises, an elongated main shaft having a threaded end and a bearing receiving surface inwardly from a remaining end of said main shaft, a drive sleeve slidable positioned on said main shaft, said drive sleeve having a bearing engagement fitting on one end thereof, an engagement pin extending from said main shaft in longitudinally spaced relation to said threaded end, an apertured mounting plate having an opening through which said drive sleeve and main shaft extend, a nut threadably disposed on said main shaft engaging a free end of said drive sleeve imparting longitudinal movement thereto as the nut is rotated, bearing alignment means on said bearing engagement fitting and means for securing said mounting plate to said marine engine.

2. The bearing alignment and insertion tool set forth in claim 1 wherein said drive sleeve has oppositely disposed longitudinally extending pin receiving slots therein.

3. The bearing alignment and insertion tool for marine engines set forth in claim 1 further comprising at least one washer disposed between said nut and said free end of said drive sleeve, said washer having a diameter greater than that of said opening in said mounting plate so as to be engaged there upon.

4. The bearing alignment and insertion tool set forth in claim 1 wherein said bearing receiving surface comprise, Multiple areas of reduced diameter.

5. The bearing alignment and insertion tool set forth in claim 1 wherein said bearing alignment means on said bearing engagement fitting comprises, an annular perimeter shoulder, a pair of oppositely disposed upstanding arcuate bearing engagement keys extending from said shoulder.

6. The bearing alignment and insertion tool set forth in claim 1 wherein said means for securing said mounting plate to said marine engine comprises, a plurality of spaced apertures, aligned with threaded fasteners extending from said marine engine.

7. The bearing alignment and insertion tool set forth in claim 1 wherein said mounting plate has at least one pair of longitudinally aligned channel notches therein extending from a center aperture in said mounting plate transversely thereacross.

* * * * *